US011064466B2

(12) United States Patent
Huang et al.

(10) Patent No.: US 11,064,466 B2
(45) Date of Patent: Jul. 13, 2021

(54) METHOD FOR COMPONENT CARRIER CONFIGURATION, BASE STATION AND USER EQUIPMENT

(71) Applicant: SHARP KABUSHIKI KAISHA, Osaka (JP)

(72) Inventors: Lei Huang, Shanghai (CN); Renmao Liu, Shanghai (CN)

(73) Assignee: SHARP KABUSHIKI KAISHA, Osaka (JP)

( * ) Notice: Subject to any disclaimer, the term of this patent is extended or adjusted under 35 U.S.C. 154(b) by 510 days.

(21) Appl. No.: 14/418,838

(22) PCT Filed: Jul. 30, 2013

(86) PCT No.: PCT/JP2013/004612
§ 371 (c)(1),
(2) Date: Jan. 30, 2015

(87) PCT Pub. No.: WO2014/020903
PCT Pub. Date: Feb. 6, 2014

(65) Prior Publication Data
US 2015/0215926 A1    Jul. 30, 2015

(30) Foreign Application Priority Data

Jul. 31, 2012   (CN) .......................... 201210266541.X

(51) Int. Cl.
*H04W 4/00*      (2018.01)
*H04W 72/04*     (2009.01)
(Continued)

(52) U.S. Cl.
CPC ....... *H04W 72/0413* (2013.01); *H04W 16/04* (2013.01); *H04W 36/0061* (2013.01); *H04W 36/0069* (2018.08); *H04W 16/32* (2013.01)

(58) Field of Classification Search
CPC ...... H04W 72/04; H04W 88/08; H04W 76/00
See application file for complete search history.

(56) References Cited

U.S. PATENT DOCUMENTS

2011/0243066 A1*  10/2011  Nayeb Nazar ........ H04L 5/0048
                                                 370/328
2011/0312316 A1*  12/2011  Baldemair ............ H04W 24/10
                                                 455/422.1
(Continued)

OTHER PUBLICATIONS

U.S. Appl. No. 61/545,204 Provisional Specification.*
3GPP TS 36.331 V10.6.0 (Jun. 2012); 3rd Generation Partnership Project; Technical Specification Group Radio Access Network; Evolved Universal Terrestrial Radio Access (E-UTRA); Radio Resource Control (RRC); Protocol specification (Release 10), pp. 46-50, 59-62,128-129.
(Continued)

*Primary Examiner* — Siren Wei
(74) *Attorney, Agent, or Firm* — Birch, Stewart, Kolasch & Birch, LLP

(57) ABSTRACT

A method for component carrier configuration is provided. The method includes: generating, by a Base Station (BS), secondary cell (SCell) configuration information and transmitting it to a User Equipment (UE); transmitting, by the BS, an SCell activation request for the UE to a micro BS and receiving from the micro BS an SCell activation response to the SCell activation request; and transmitting, by the BS, SCell activation information to the UE if the received SCell activation response indicates that the SCell activation request is accepted by the micro BS. The SCell configuration information contains group numbers and indices of SCells associated with the BS and the micro BS, respectively, and indicates a secondary primary cell (S-PCell) associated with the micro BS. The present invention also provides a BS and a UE. With the method for component carrier configuration and the corresponding BS and UE according to the present invention, the channel state information of the UE can be fed back on an uplink working of the micro cell base station.

16 Claims, 5 Drawing Sheets

(51) Int. Cl.
*H04W 36/00* (2009.01)
*H04W 16/04* (2009.01)
*H04W 16/32* (2009.01)

(56) References Cited

U.S. PATENT DOCUMENTS

| | | | | |
|---|---|---|---|---|
| 2011/0312328 | A1* | 12/2011 | Choi | H04L 5/0062 455/450 |
| 2012/0087257 | A1* | 4/2012 | Larsson | H04W 36/0072 370/252 |
| 2012/0250520 | A1* | 10/2012 | Chen | H04L 5/001 370/241 |
| 2012/0257601 | A1* | 10/2012 | Kim | H04L 5/0098 370/336 |
| 2012/0300715 | A1* | 11/2012 | Pelletier | H04W 74/0891 370/329 |
| 2013/0182687 | A1* | 7/2013 | Ng | H04W 56/0015 370/336 |
| 2013/0250908 | A1* | 9/2013 | Bach | H04W 52/0206 370/331 |
| 2013/0322397 | A1* | 12/2013 | Lee | H04L 5/001 370/329 |

OTHER PUBLICATIONS

ETSI TS 136 321 V10.0.0 (Jan. 2011), LTE; Evolved Universal Terrestrial Radio Access (E-UTRA); Medium Access Control (MAC) protocol specification (3GPP TS 36.321 version 10.0.0 Release 10), pp. 1-54.
NTT DoCoMo, RWS-120010, "Requirements Candidate Solutions & Technology Roadmap for LTE Rel-12 Onward", 3GPP Workshop on Release 12 and onwards, Ljubljana, Slovenia, Jun. 11-12, 2012, 27 pages.
ETSI: Technical Specification Group Radio Access Network; Evolved Universal Terrestrial Radio Access (E-UTRA); Radio Resource Control (RRC); Release 10, 3GPP TS 36.331 V10.6.0 Jun. 1, 2012.
European Search Report dated Feb. 23, 2016 in the corresponding European Patent Application No. 13825467.7.
New Postcom: "PUCCH on SCell", 3GPP TSG-RAN2#76, R2-115977, San Francisco, US, Nov. 14-18, 2011.
Sharp: "Special SCell for CA Enhancement" 3GPP TSG-RAN WG2#75, R2-114096, Athens, Greece, Aug. 22-26, 2011.
Sharp: "Uplink reporting for inter-band carrier aggregation with different TDD configurations", 3GPP TSG-RAN WG1 #66; R1-113345; Zhuhai, China, Oct. 10-14, 2011.

* cited by examiner

METHOD FOR COMPONENT CARRIER CONFIGURATION, BASE STATION AND USER EQUIPMENT

TECHNICAL FIELD

The present invention relates to wireless communication technology, and more particularly, to a method for component carrier configuration, a base station and a user equipment.

BACKGROUND ART

Inter-Site Carrier Aggregation technique can be considered as an enhancement to the Carrier Aggregation technique for heterogeneous networks. As described in the following Non Patent Literature 1 ("RWS-120010, NTT DoCoMo, Requirements Candidate Solutions & Technology Roadmap for LTE Rel-12 Onward"), in heterogeneous networks, a macro cell base station can operate on a carrier at 2 GHz and a micro cell base station can operate on a carrier at 3.5 GHz. A user equipment (UE) can be served by a macro cell and a micro cell simultaneously. In this case the UE transmits data on the control plane (C-plane) via the macro cell base station and the micro base station data is only involved in transmission of data on the user plane (U-plane). In this way, the UE can have better connectivity and mobility via the macro cell base station operating at a low frequency band and higher system throughput via the micro cell base station operating at a high frequency band for a broader bandwidth.

According to Long Term Evolution (LTE) Release 12 and its subsequent releases, when a system utilizes the inter-site carrier aggregation technique, it will necessarily have some impacts on the existing system, e.g., with respect to the design of Physical Uplink Control Channel (PUCCH). In the current release of LTE, since the carrier aggregation technique is only applied in a single base station, a pair of component carriers is defined as primary component carriers. The PUCCH is only transmitted on the primary component carriers.

In a scenario where the inter-site carrier aggregation technique is employed, according to its characteristics, the pair of primary component carriers should be a pair of working carriers of a macro cell base station since the primary component carriers are closely related to UE measurement and mobility management which are essential functions of the macro cell base station.

CITATION LIST

Non Patent Literature

NPL 1: "RWS-120010, NTT DoCoMo, Requirements Candidate Solutions & Technology Roadmap for LTE Rel-12 Onward" (Jun. 11, 2012)

SUMMARY OF INVENTION

Technical Problem

However, depending on the actual system configuration, there may be a shorter transmission distance and a higher uplink data transmission capacity between a UE and a micro cell base station. Thus, it is desired to feed back channel state information of the UE on an uplink working carrier of the micro cell base station.

Solution to Problem

In order to overcome the above problem, the prevent invention provides a method for component carrier configuration, a base station and a user equipment.

According to an aspect of the present invention, a method for component carrier configuration is provided. The method includes: generating, by a Base Station (BS), secondary cell (SCell) configuration information and transmitting it to a User Equipment (UE); transmitting, by the BS, an SCell activation request for the UE to a micro BS and receiving from the micro BS an SCell activation response to the SCell activation request; and transmitting, by the BS, SCell activation information to the UE if the received SCell activation response indicates that the SCell activation request is accepted by the micro BS. The SCell configuration information contains group numbers and indices of SCells associated with the BS and the micro BS, respectively, and indicates a secondary primary cell (S-PCell) associated with the micro BS.

According to another aspect of the present invention, a Base Station (BS) is provided. The BS includes: a secondary cell (SCell) configuration unit configured to generate secondary cell (SCell) configuration information and transmit it to a User Equipment (UE); an SCell activation request unit configured to transmit an SCell activation request for the UE to a micro BS and receive from the micro BS an SCell activation response to the SCell activation request; and an SCell activation unit configured to transmit SCell activation information to the UE if the received SCell activation response indicates that the SCell activation request is accepted by the micro BS. The SCell configuration information contains group numbers and indices of SCells associated with the BS and the micro BS, respectively, and indicates a secondary primary cell (S-PCell) associated with the micro BS.

According to yet another aspect of the present invention, a User Equipment (UE), is provided. The UE includes: a reception unit configured to receive from a Base Station (BS) secondary cell (SCell) configuration information containing group numbers and indices of SCells associated with the BS and a micro BS, respectively, and indicating a secondary primary cell (S-PCell) associated with the micro BS; and a transmission unit configured to transmit a Physical Uplink Control Channel (PUCCH) on an uplink component carrier corresponding to the S-PCell upon receiving the SCell activation information from the BS.

Advantageous Effects of Invention

With the method for component carrier configuration and the corresponding BS and UE according to the present invention, the channel state information of the UE can be fed back on an uplink working carrier of the micro cell base station.

DESCRIPTION OF EMBODIMENTS

The embodiments of the present disclosure will be detailed below with reference to the drawings. It should be noted that the following embodiments are illustrative only, rather than limiting the scope of the present disclosure. In the following description, details of well known techniques which are not directly relevant to the present invention will be omitted so as not to obscure the concept of the invention.

In the following, a number of embodiments of the present invention will be detailed in an exemplary application environment of LTE Rel-12 mobile communication system and its subsequent evolutions. Herein, it is to be noted that the present invention is not limited to the application exemplified in the embodiments. Rather, it is applicable to other communication systems, such as the future 5G cellular communication system.

In order to better explain the contents of the present invention, a process of configuring component carriers in a LTE Rel-10 system will be briefly described at first.

Figure 1A:
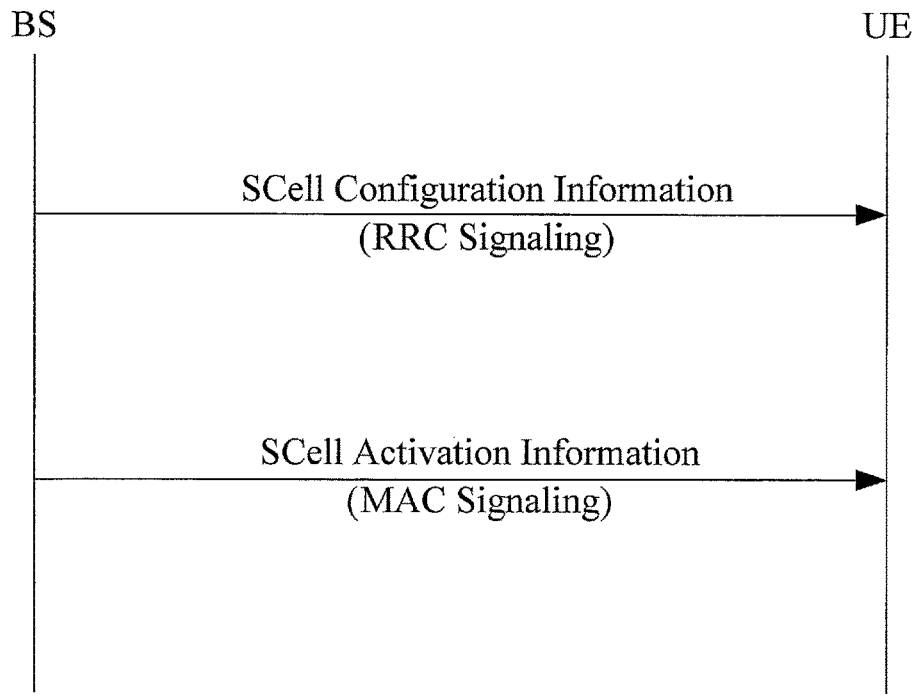
FIG. 1(a) is a schematic diagram showing a process in which a BS notifies a UE of SCell configuration information according to the prior art.

Initially, a UE performs random access and RRC connection operations in a primary cell (PCell) (in LTE Rel-10, a cell is defined as a pair of carriers for uplink/downlink data transmission and a PCell is defined as a cell capable of providing all the necessary control information and functions). After security verification of the system, a BS can configure, for a UE that supports carrier aggregation, one or more secondary cells (SCells) (other serving cells configured for the UE in addition to the PCell). (Generally, the serving cells include the PCell and the SCells.) As shown in FIG. 1(a), the BS notifies the UE of the SCell configuration information via RRC signaling to add or release an SCell of the UE. In Reference 2 ("3GPP TS 36.331, Radio Resource Control (RRC) Protocol specification (Release 10)"), the above RRC signaling is defined as follows:

| RRC Connection Reconfiguration message |
|---|
| ```
-- ASN1START
...
RRCConnectionReconfiguration-v1020-IEs ::= SEQUENCE {
    SCellToReleaseList-r10    SCellToReleaseList-r10    OPTIONAL,  -- Need ON
    SCellToAddModList-r10     SCellToAddModList-r10     OPTIONAL,  -- Need ON
    ...
}
SCellToAddModList-r10 ::=    SEQUENCE (SIZE (1..maxSCell-r10)) OF SCellToAddMod-r10
SCellToAddMod-r10 ::=        SEQUENCE {
                                 sCellIndex-r10         SCellIndex-r10,
                                 cellIdentification-r10 SEQUENCE {
                                     physCellId-r10     PhysCellId,
                                     dl-CarrierFreq-r10 ARFCN-ValueEUTRA
                                 }OPTIONAL,  -- Cond SCellAdd
                                 ...
}
SCellToReleaseList-r10 ::=   SEQUENCE (SIZE (1..maxSCell-r10)) OF SCellIndex-r10
...
-- ASN1STOP
``` |

The above RRC signaling message contains two fields related to the SCell configuration information. The first one is an sCellToReleaseList-r10 field which defines a set of SCells to be released by this signaling message. The set of SCells is represented by ID numbers of the SCells (i.e., SCellIndex-r10). The second one is an SCellToAd-dMod-List-r10 field which defines a set of SCells to be added by this signaling message. The set of SCells is represented by SCellToAddMod-r10 containing information on the SCells. In particular, SCellToAddMod-r10 contains ID numbers of the SCells, ID numbers of physical cells and carrier frequency numbers of the SCells.

Figure 1B:
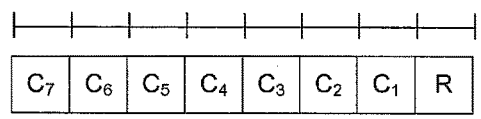
FIG. 1(b) is a schematic diagram of a MAC control unit according to the prior art.

As shown in FIG. 1(a), after successfully configuring one or more SCells for the UE via the above RRC signaling message, the configured SCells can be activated or deactivated by MAC layer signaling. In particular, Reference 3 (3GPP TS 36.321, Medium Access Control (MAC) protocol specification (Release 10)) defines a MAC control unit, as shown in FIG. 1(b), for activating and deactivating an SCell. As shown in FIG. 1(b), if an SCell having an SCellIndex of i is configured for the UE, Ci indicates the active state of the SCell. Otherwise the UE ignores the Ci field. Ci equal to 1 indicates that the SCell having the SCellIndex of i is to be activated, while Ci equal to 0 indicates that the SCell having the SCellIndex of i is to be deactivated. The R field is a reserved bit set to a constant of 0.

Figure 2:
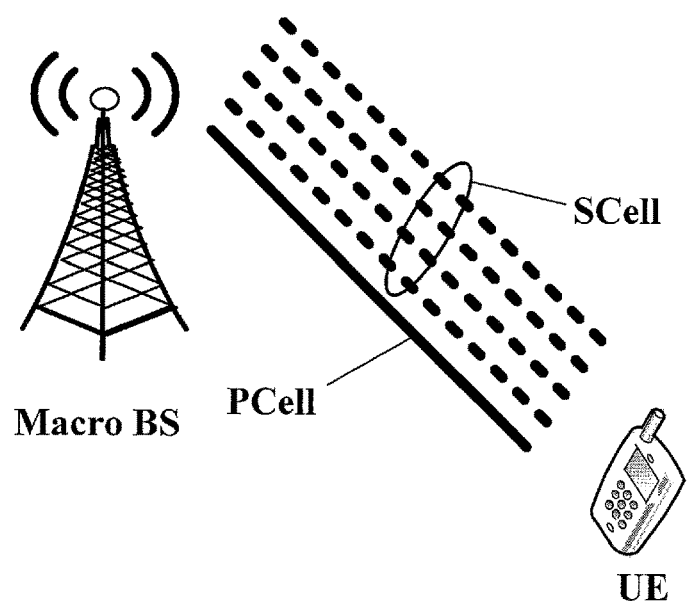
FIG. 2 is a schematic diagram showing a scenario in which a BS transmits data to a UE on a number of carriers according to the prior art.

In the LTE Rel-10 system, since the carrier aggregation is only possible in a single BS, as shown in FIG. 2, a BS can transmit data to a UE on a number of carriers. For each UE, there is only one PCell defined for operations such as system information acquisition, random access, semi-static data scheduling, RLM measurement and transmission of PUCCH information. Additionally, up to four SCells can be configured for a UE to transmit UE data. Any of the SCells can be activated or deactivated via the above MAC signaling, but the PCell cannot be deactivated.

Figure 3:
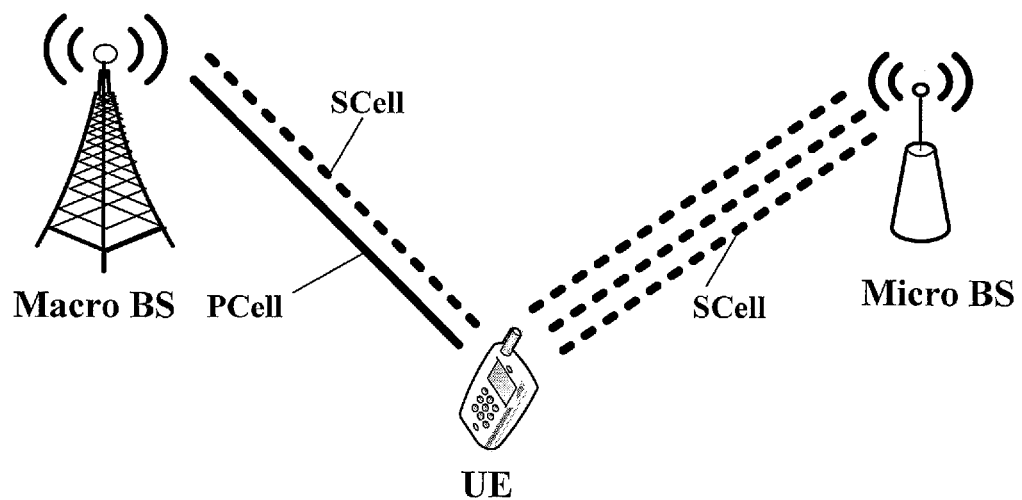
FIG. 3 is a schematic diagram showing carrier aggregation of a BS and a micro BS according to the prior art.

In LTE Rel-12 and its subsequent releases, a system may employ an inter-BS carrier aggregation as shown in FIG. 3. As shown in FIG. 3, a UE is served by two serving cells of a macro BS (also referred to as "BS" herein) and three serving cells of a micro BS simultaneously. The control plane data is transmitted via the serving cells of the macro BS and the user plane data is transmitted via the serving cells of the micro BS. According to the current specification, a UE can only have one PCell which is one of the serving cells of the macro BS. While the UE may have a better link condition with the micro BS, according to the current specification, the SPS service of the UE can only be scheduled to be communicated with the macro BS on the PCell. Also, since the PUCCH can only be transmitted on the PCell, CSI can only be fed back to the macro BS on an uplink component carrier corresponding to the PCell. This will necessarily have impacts on the system performance.

In view of this, according to the present invention, the serving cells are divided into groups based on BS sites (BS or micro BS) and one of the serving cells associated with the micro BS is selected as a secondary PCell (S-PCell). The UE can transmit the PUCCH on the uplink component carrier corresponding to the S-PCell to feed back CSI for the downlink component carriers corresponding to the serving cells of the micro BS. The UE can also transmit its SPS service on the downlink component carrier corresponding to the S-PCell. The PUCCH that is transmitted by the UE on the uplink component carrier corresponding to the PCell of the BS is only used to feed back CSI for the downlink component carriers corresponding to the serving cells of the BS. In the following, the solutions of component carrier configuration according to the present invention will be detailed with reference to FIGS. 4-6.

Figure 4:
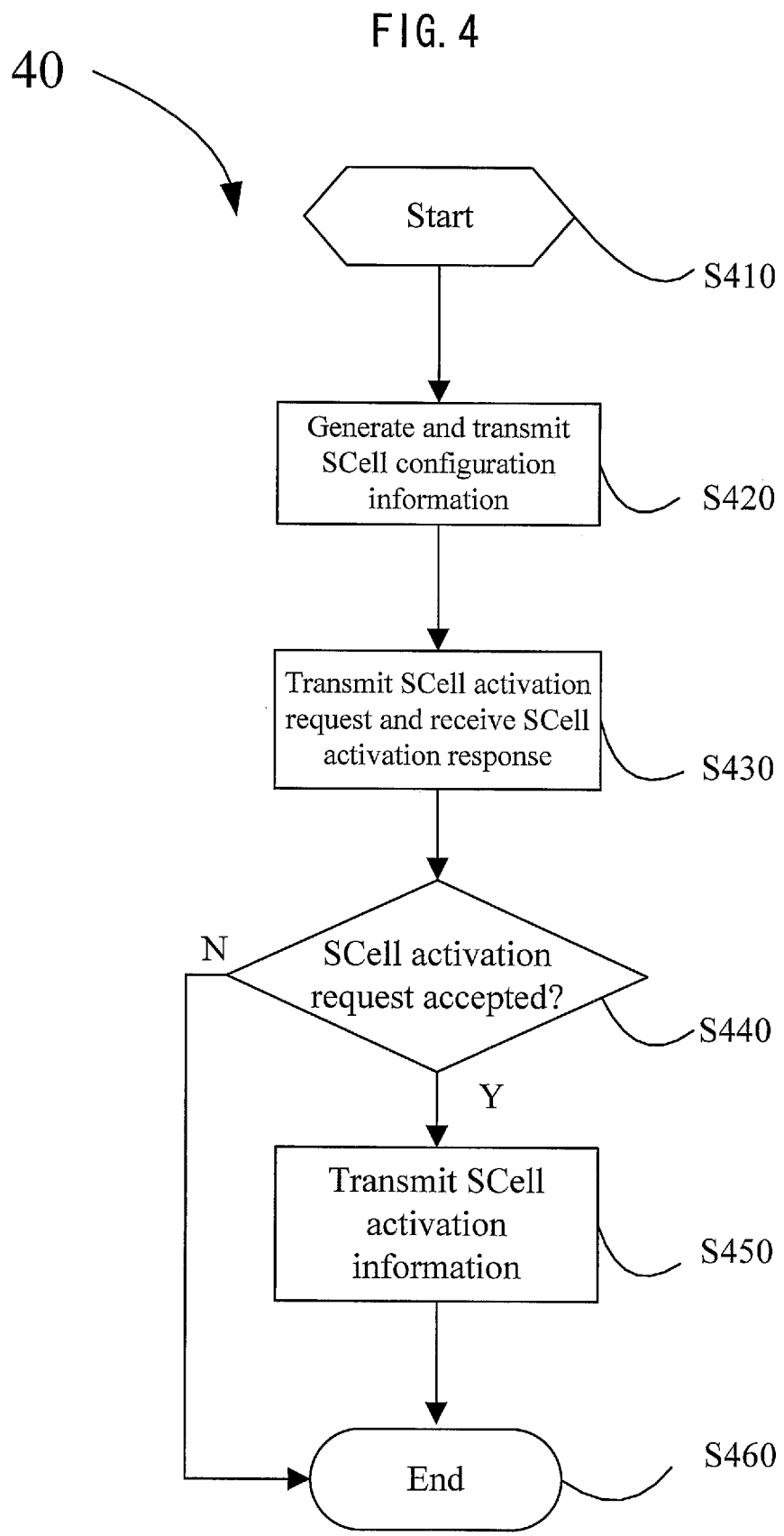
FIG. 4 is a flowchart illustrating a method for component carrier configuration according to an embodiment of the present invention.

FIG. 4 is a flowchart illustrating a method for component carrier configuration according to an embodiment of the present invention. The method starts with step S410.

At step S420, a BS generates SCell configuration information and transmits it to a UE via RRC signaling.

Then, at Step S430, the BS transmits an SCell activation request for a particular UE to a micro BS via X2 interface signaling. Accordingly, the micro BS feeds back an SCell activation response to the BS.

After receiving the SCell activation response, the BS transmits SCell activation information to the UE via MAC layer signaling at step S450 if the received SCell activation response indicates that the SCell activation request is accepted by the micro BS ("yes" in Step S440). Then the method ends at step S460. The SCell configuration information contains group numbers and indices of SCells associated with the BS and the micro BS, respectively, and indicates a S-PCell associated with the micro BS.

If it is "no" in step S440, the method will skip the step S450 and jump to the step S460 where it ends.

Figure 5:
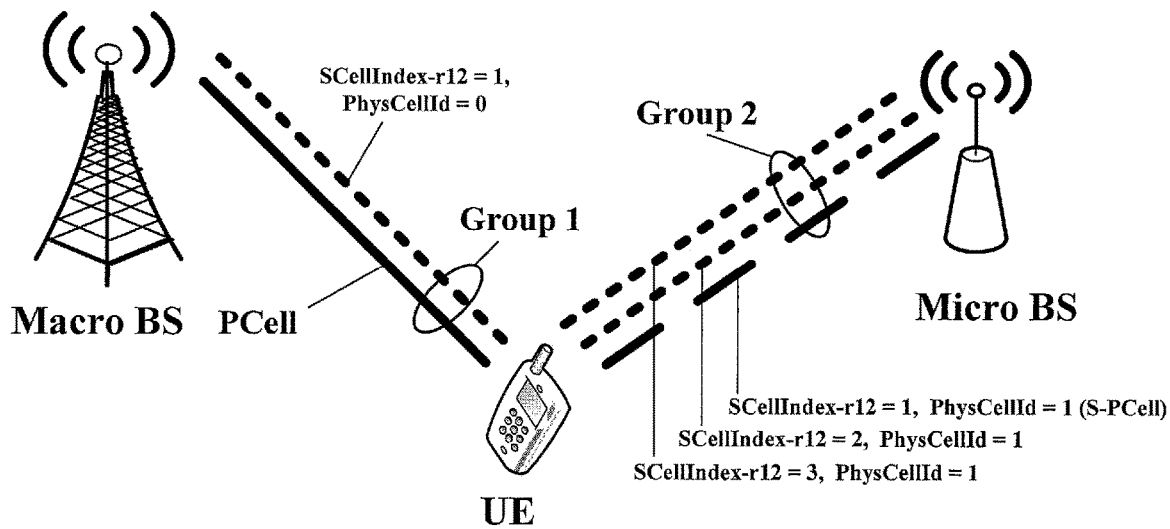
FIG. 5 is a schematic diagram showing carrier aggregation of a BS and a micro BS according to an embodiment of the present invention.

FIG. 5 is a schematic diagram showing carrier aggregation of a BS and a micro BS according to an embodiment of the present invention. In the example shown in FIG. 5, two or more SCells configured for the UE can be divided into a number of groups depending on the station sites associated with the SCells (BS or micro BS). The SCells in each group have the same physical cell ID and the indices of the SCells in different groups are numbered separately. Different groups can be distinguished from each other based on their physical cell IDs. In each of the SCell groups other than the one to which the PCell belongs, the S-PCell within the group is determined based on the values of the indices of the SCells in the group. For example, as shown in FIG. 5, the SCell having the smallest SCell index can be determined as the S-PCell. Of course, alternatively, the SCell having the largest SCell index can be determined as the S-PCell.

Accordingly, the RRC signaling in the above embodiment can be described as follows.

| RRC Connection Reconfiguration message |
| --- |

```
-- ASN1START
...
RRCConnectionReconfiguration-v1020-IEs ::= SEQUENCE {
    sCellToReleaseList-r12      SCellToReleaseList-r12      OPTIONAL,  -- Need ON
    sCellToAddModList-r12       SCellToAddModList-r12       OPTIONAL,  -- Need ON
    ...
}
SCellToAddModList-r12 ::=   SEQUENCE (SIZE (1..maxSCell-r12)) OF SCellToAddMod-r12
SCellToAddMod-r12 ::=       SEQUENCE {
                                sCellIndex-r12              SCellIndex-r12,
                                cellIdentification-r12      SEQUENCE {
                                    physCellId-r12              PhysCellId,
                                    dl-CarrierFreq-r12          ARFCN-ValueEUTRA
                                }OPTIONAL,   -- Cond SCellAdd
                                ...
}
SCellToReleaseList-r12 ::=  SEQUENCE (SIZE (1..maxSCell-r12)) OF SCellToReleaseMod-r12
SCellToReleaseMod-r12 ::=   SEQUENCE {
                                sCellIndex-r12      SCellIndex-r12,
                                physCellId-r12      PhysCellId
                            }
...
-- ASN1STOP
```

In the above signaling message, since for a particular UE each SCell does not have a unique SCell index, in a list of SCells to be released, an SCell to be released needs to be uniquely determined based on its SCell index and physical cell ID (i.e., group number of the SCell).

Accordingly, another RRC signaling in the above embodiment can be described as follows.

| RRC Connection Reconfiguration message |
|---|

```
-- ASN1START
...
RRCConnectionReconfiguration-v1020-IES ::= SEQUENCE {
    sCellToReleaseList-r12-g1       SCellToReleaseList-r12-g1       OPTIONAL,  -- Need ON
    sCellToReleaseList-r12-g2       SCellToReleaseList-r12-g2       OPTIONAL,  -- Need ON
    sCellToAddModList-r12-g1        SCellToAddModList-r12-g1        OPTIONAL,  -- Need ON
    sCellToAddModList-r12-g2        SCellToAddModList-r12-g2        OPTIONAL,  -- Need ON
    ...
}
SCellToAddModList-r12-g1 ::=    SEQUENCE (SIZE (1..maxSCell-r12-g1)) OF SCellToAddMod-r12
SCellToAddModList-r12-g2 ::=    SEQUENCE (SIZE (1..maxSCell-r12-g2)) OF SCellToAddMod-r12
SCellToAddMod-r12 ::=           SEQUENCE {
                                    sCellIndex-r12              SCellIndex-r12,
                                    cellIdentification-r12      SEQUENCE {
                                        physCellId-r12              PhysCellId,
                                        dl-CarrierFreq-r12          ARFCN-ValueEUTRA
                                    }OPTIONAL,   -- Cond SCellAdd
                                    ...
}
SCellToReleaseList-r12-g1 ::=   SEQUENCE (SIZE (1..maxSCell-r12-g1)) OF sCellIndex-r12
SCellToReleaseList-r12-g2 ::=   SEQUENCE (SIZE (1..maxSCell-r12-g2)) OF sCellIndex-r12
...
-- ASN1STOP
```

In the above signaling message, different groups are configured separately such that the SCells in each group can be added or released.

Alternatively, in the example shown in FIG. 5, the SCells can be grouped based on their respective Timing Advance (TA) group numbers. For example, in LTE Rel-11, a secondary timing advance group (sTAG) will be introduced for each SCell. The SCells having the same sTAG number will have the same TA. Since, in LTE Rel-12 and its subsequent releases, high frequency carriers will be used in a micro cell, a micro cell BS and a macro BS will have different TAs with respect to a UE and serving cells of the BSs will belong to different TA groups. Thus, it is possible to set the SCell group numbers based on the sTAG numbers. In other words, the group number of each SCell may be set based on a Timing Advance (TA) group number corresponding to the SCell.

Figure 6:
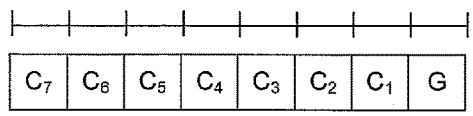
FIG. 6 is a schematic diagram of a MAC control unit according to an embodiment of the present invention.

Accordingly, in a MAC control unit for activating or deactivating an SCell, the Least Significant Bit (LSB) can be redefined as G for indicating the group to which the SCell to be activated or deactivated by the MAC signaling belongs. FIG. 6 is a schematic diagram of a MAC control unit according to an embodiment of the present invention. As shown in FIG. 6, if G is 0, an SCell of the BS can be activated or deactivated and the definition of Ci can be the same as that in LTE Rel-10. If G is 1, an SCell of the micro BS can be activated or deactivated.

Figure 7:
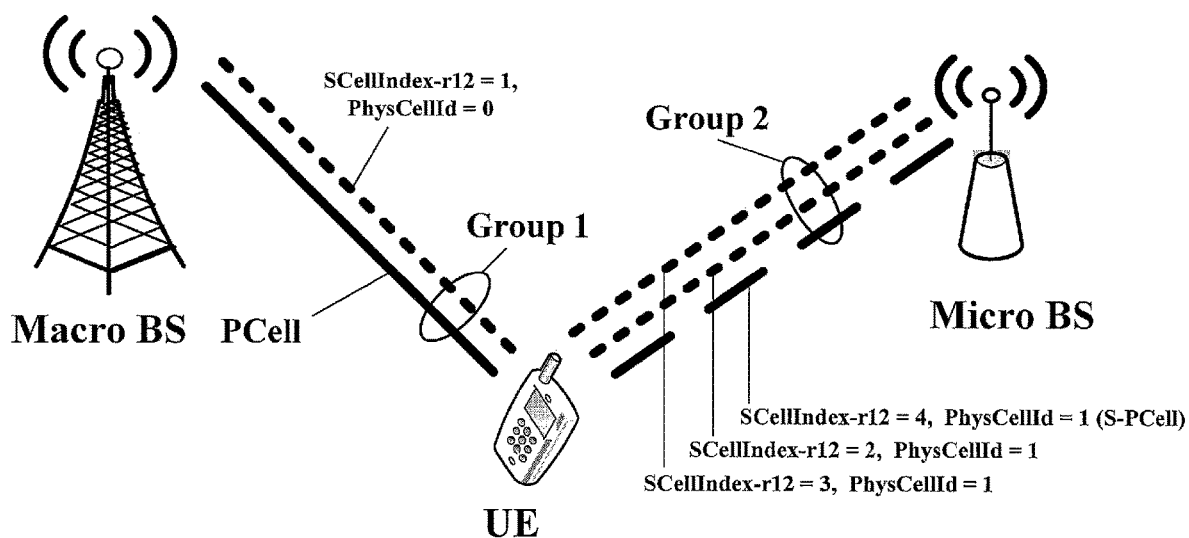
FIG. 7 is a schematic diagram showing carrier aggregation of a BS and a micro BS according to another embodiment of the present invention.

FIG. 7 is a schematic diagram showing carrier aggregation of a BS and a micro BS according to another embodiment of the present invention. In the example shown in FIG. 7, two or more SCells configured for the UE can be divided into a number of groups depending on the station sites associated with the SCells (BS or micro BS). The SCells in each group have the same physical cell ID and the indices of the SCells in all the groups are numbered jointly. In each of the SCell groups other than the one to which the PCell belongs, the S-PCell within the group is determined based on the values of the indices of the SCells in the group. For example, as shown in FIG. 5, each of the SCells (including the SCells of the macro BS and the SCells of the micro BS) has a unique SCell index and the SCell of the micro BS that has the smallest SCell index is selected as the S-PCell. Of course, alternatively, the SCell having the largest SCell index can be selected as the S-PCell.

Figure 8:
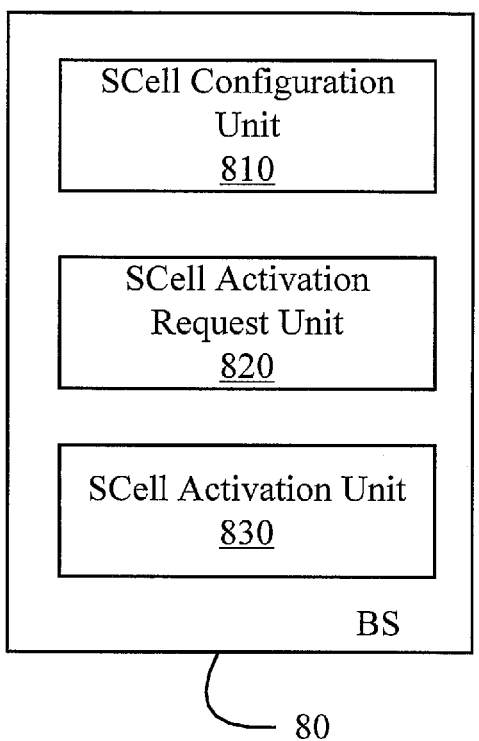
FIG. 8 is a block diagram of a BS according to an embodiment of the present invention.

FIG. 8 is a block diagram of a BS according to an embodiment of the present invention. As shown in FIG. 8, the BS 80 includes an SCell configuration unit 810, an SCell activation request unit 820 and an SCell activation unit 830. The BS 80 shown in FIG. 8 can be used as the macro BS (BS) in the exemplary scenarios shown in FIGS. 5 and 7.

The SCell configuration unit 810 is configured to generate SCell configuration information and transmit it to a UE. The SCell activation information contains group numbers and indices of SCells associated with the BS and the micro BS, respectively, and indicates a S-PCell associated with the micro BS. Preferably, the group numbers of the SCells associated with the BS are set to be identical to each other and the group numbers of the SCells associated with the micro BS ate set to be identical to each other. In addition, the SCell configuration unit 810 can number the indices of the SCells having different group numbers separately, or number the indices of all the SCells jointly. Further, the SCell configuration unit 810 can select one of the SCells associated with the micro BS which has the largest or smallest index as the S-PCell associated with the micro BS.

The SCell activation request unit 820 is configured to transmit an SCell activation request for the UE to a micro BS and receive from the micro BS an SCell activation response to the SCell activation request.

The SCell activation unit 830 is configured to transmit SCell activation information to the UE if the received SCell activation response indicates that the SCell activation request is accepted by the micro BS. Preferably, the SCell activation information can contain a bit indicating a group number of an SCell to be activated (e.g., the bit "G" as shown in FIG. 6). The group number of each SCell can include a physical cell identifier.

Figure 9:
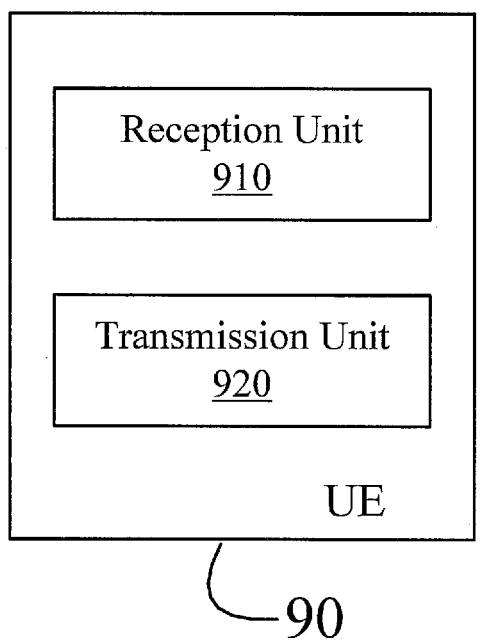
FIG. 9 is a block diagram of a UE according to an embodiment of the present invention.

FIG. 9 is a block diagram of a UE according to an embodiment of the present invention. As shown in FIG. 9, the UE 90 includes a reception unit 910 and a transmission unit 920. The UE 90 shown in FIG. 9 can be used as the UE in the exemplary scenarios of FIGS. 5 and 7.

The reception unit 910 is configured to receive, from a BS, SCell configuration information containing group numbers and indices of SCells associated with the BS and a micro BS, respectively, and indicating an S-PCell associated with the micro BS. Preferably, the group numbers of the SCells associated with the BS are identical to each other and the group numbers of the SCells associated with the micro BS are identical to each other. Preferably, the S-PCell associated with the micro BS is one of the SCells associated with the micro BS which has the largest or smallest index.

The transmission unit 920 is configured to transmit a Physical Uplink Control Channel (PUCCH) on an uplink component carrier corresponding to the S-PCell upon receiving the SCell activation information from the BS. Preferably, the SCell activation information contains a bit indicating a group number of an SCell to be activated (e.g., the bit "G" as shown in FIG. 6).

With the method for component carrier configuration and the corresponding BS and UE according to the present invention, the channel state information of the UE can be fed back on an uplink working carrier of the micro cell base station.

It can be appreciated that the above embodiments of the present invention can be implemented in software, hardware or any combination thereof. For example, the internal components of the BS and the UE in the above embodiments can be implemented using various devices including, but not limited to, analog circuit device, digital circuit device, Digital Signal Processing (DSP) circuit, programmable processor, Application Specific Integrated Circuit (ASIC), Field Programmable Gate Array (FPGA), Programmable Logic Device (CPLD) and so on.

In the present application, the term "base station" means a mobile communication data and control exchange center with a large transmit power and a wide coverage area and including functions such as resource allocation/scheduling, data reception/transmission and the like. The term "user equipment" means a user mobile terminal, including e.g., a mobile phone, a notebook computer and other terminal devices that can wirelessly communicate with a BS or and micro BS.

The present disclosure has been described above with reference to the preferred embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached and the equivalents thereof.

The present invention can also be expressed as follows.

According to an aspect of the present invention, a method for component carrier configuration is provided. The method includes: generating, by a Base Station (BS), secondary cell (SCell) configuration information and transmitting it to a User Equipment (UE); transmitting, by the BS, an SCell activation request for the UE to a micro BS and receiving from the micro BS an SCell activation response to the SCell activation request; and transmitting, by the BS, SCell activation information to the UE if the received SCell activation response indicates that the SCell activation request is accepted by the micro BS. The SCell configuration information contains group numbers and indices of SCells associated with the BS and the micro BS, respectively, and indicates a secondary primary cell (S-PCell) associated with the micro BS.

Preferably, the group numbers of the SCells associated with the BS are set to be identical to each other and the group numbers of the SCells associated with the micro BS are set to be identical to each other.

Preferably, the group number of each SCell is set based on a Timing Advance (TA) group number corresponding to the SCell.

Preferably, the indices of the SCells having different group numbers are numbered separately.

Preferably, the indices of all the SCells are numbered jointly.

Preferably, one of the SCells associated with the micro BS which has the largest or smallest index is selected as the S-PCell associated with the micro BS.

Preferably, the SCell activation information contains a bit indicating a group number of an SCell to be activated.

Preferably, the group number of each SCell comprises a physical cell identifier.

According to another aspect of the present invention, a Base Station (BS) is provided. The BS includes: a secondary cell (SCell) configuration unit configured to generate secondary cell (SCell) configuration information and transmit it to a User Equipment (UE); an SCell activation request unit configured to transmit an SCell activation request for the UE to a micro BS and receive from the micro BS an SCell activation response to the SCell activation request; and an SCell activation unit configured to transmit SCell activation information to the UE if the received SCell activation response indicates that the SCell activation request is accepted by the micro BS. The SCell configuration information contains group numbers and indices of SCells associated with the BS and the micro BS, respectively, and indicates a secondary primary cell (S-PCell) associated with the micro BS.

Preferably, the SCell configuration unit is further configured to set the group numbers of the SCells associated with the BS to be identical to each other and set the group numbers of the SCells associated with the micro BS to be identical to each other.

Preferably, the SCell configuration unit is further configured to set the group number of each SCell based on a Timing Advance (TA) group number corresponding to the SCell.

Preferably, the SCell configuration unit is further configured to number the indices of the SCells having different group numbers separately.

Preferably, the SCell configuration unit is further configured to number the indices of all the SCells jointly.

Preferably, the SCell configuration unit is further configured to select one of the SCells associated with the micro BS which has the largest or smallest index as the S-PCell associated with the micro BS.

Preferably, the SCell activation information contains a bit indicating a group number of an SCell to be activated.

Preferably, the group number of each SCell comprises a physical cell identifier.

According to yet another aspect of the present invention, a User Equipment (UE), is provided. The UE includes: a reception unit configured to receive from a Base Station (BS) secondary cell (SCell) configuration information containing group numbers and indices of SCells associated with the BS and a micro BS, respectively, and indicating a secondary primary cell (S-PCell) associated with the micro BS; and a transmission unit configured to transmit a Physical Uplink Control Channel (PUCCH) on an uplink component carrier corresponding to the S-PCell upon receiving the SCell activation information from the BS.

Preferably, the group numbers of the SCells associated with the BS are identical to each other and the group numbers of the SCells associated with the micro BS are identical to each other.

Preferably, the S-PCell associated with the micro BS is one of the SCells associated with the micro BS which has the largest or smallest index.

Preferably, the SCell activation information contains a bit indicating a group number of an SCell to be activated.

With the method for component carrier configuration and the corresponding BS and UE according to the present invention, the channel state information of the UE can be fed back on an uplink working carrier of the micro cell base station.

The invention claimed is:

1. A base station apparatus comprising:
request circuitry configured to and/or programmed to transmit a request to another base stationapparatus for performing actions on a second cell group for one terminal apparatus;
response reception circuitry configured to and/or programmed to receive a response for the request;
configuration circuitry configured to and/or programmed to
configure (i) a first cell group for (a) the one terminal apparatus and (b) the base station apparatus which is one base station apparatus and (ii) a second cell group for (a) the one terminal apparatus and (b) the another base station apparatus, the first cell group comprising a PCell (Primary Cell), and
transmit, to the one terminal apparatus, information that indicates a cell included in the second cell group as a secondary PCell, SPS (Semi-Persistent Scheduling) being configured for the secondary PCell; and
reception circuitry configured to and/or programmed to receive a PUCCH (Physical Uplink Control CHannel) on the secondary PCell, wherein
the second cell group and the first cell group respectively belong to the another base station apparatus and the one base station apparatus which are in connection with the one terminal apparatus.

2. The base station apparatus according to claim 1 further comprising:
request circuitry configured to and/or programmed to transmit an x2 signal which is used to request adding a cell to the second cell group.

3. The base station apparatus according to claim 1 wherein
the configuration circuitry is configured to and/or programmed to transmit a reconfiguration message to release a cell from or to add a cell to the second cell group.

4. The base station apparatus according to claim 1, wherein
transmission timing advance of a cell which is included in the second cell group and is other than the secondary PCell, is same as transmission timing advance of the secondary PCell in a case where the cell and the secondary PCell belong to a same timing advance group.

5. The base station apparatus according to claim 1, wherein
an index of the secondary PCell is larger or smaller than an index of any other cell in the second cell group.

6. A terminal apparatus comprising:
reception circuitry configured to and/or programmed to be configured with (i) a first cell group for (a) the terminal apparatus and (b) one base station apparatus and (ii) a second cell group for (a) the terminal apparatus and (b) another base station apparatus, the first cell group comprising a PCell (Primary Cell), and
receive, from the one base station apparatus, information that indicates a cell included in the second cell group as a secondary PCell, SPS (Semi-Persistent Scheduling) being configured for the secondary PCell; and
transmission circuitry configured to and/or programmed to transmit a first PUCCH (Physical Uplink Control CHannel) on the PCell and to transmit a second PUCCH on the secondary PCell, wherein
the second cell group and the first cell group respectively belong to the another base station apparatus and the one base station apparatus which are in connection with the terminal apparatus.

7. The terminal apparatus according to claim 6, wherein
the reception circuitry is configured to and/or programmed to receive a reconfiguration message to release a cell from or to add a cell to the second cell group.

8. The terminal apparatus according to claim 6, wherein
transmission timing advance of a cell which is included in the second cell group and is other than the secondary PCellis same as transmission timing advance of the secondary PCell in a case where the cell and the secondary PCell belong to a same timing advance group.

9. The terminal apparatus according to claim 6, wherein
indexes of cells included in the first cell group are set independently with indexes of cells in the second cell group.

10. The terminal apparatus according to claim 6, wherein
indexes of cells included in the first cell group and indexes of cells included in the second cell group are jointly numbered.

11. The terminal apparatus according to claim 6, wherein
an index of the secondary PCell is larger or smaller than any other index of cell in the second cell group.

12. A communication method of a base station apparatus comprising:
transmitting a request to another base station apparatus for performing actions on a second cell group for one terminal apparatus;
receiving a response to the request;
configuring a first cell group for (a) the one terminal apparatus and (b) the base station apparatus which is one base station apparatus and (ii) a second cell group for (a) the one terminal apparatus and (b) the another base station apparatus, the first cell group comprising a PCell (Primary Cell),
transmitting, to the one terminal apparatus, information that indicates a cell included in the second cell group as a secondary PCell, SPS (Semi-Persistent Scheduling) being configured for the secondary PCell; and
receiving a PUCCH (Physical Uplink Control CHannel) on the secondary PCell, wherein
the second cell group and the first cell group respectively belong to the another base station apparatus and the one base station apparatus which are in connection with the one terminal apparatus.

13. A communication method of a terminal apparatus comprising:
being configured with (i) a first cell group for (a) the terminal apparatus and (b) one base station apparatus and (ii) a second cell group for (a) the terminal apparatus and (b) another base station apparatus, the first cell group comprising a PCell (Primary Cell), receiving, from the one base station apparatus, information that indicates a cell included in the second cell group as a secondary PCell, SPS (Semi-Persistent Scheduling) being configured for the secondary PCell;

transmitting a first PUCCH (Physical Uplink Control CHannel) on the PCell and transmitting a second PUCCH on the secondary PCell, wherein the second cell group and the first cell group respectively belong to the another base station apparatus and the one base station apparatus which are in connection with the terminal apparatus.

14. The terminal apparatus according to claim 6 further comprising:

transmission circuitry configured to and/or programmed to transmit CSI of first cell group on a first PUCCH (Physical Uplink Control CHannel) on the PCell and to transmit CSI of second cell group on a second PUCCH on the secondary PCell.

15. The terminal apparatus according to claim 6, wherein the indexes of cells included in the second cell group is different from the indexes of cells included in the first cell group.

16. The terminal apparatus according to claim 15, wherein indexes of cells included in the first cell group and indexes of cells included in the second cell group are jointly numbered.

* * * * *